United States Patent
Beckley et al.

[11] 4,309,922
[45] Jan. 12, 1982

[54] ROD BREAK-OUT AND MAKE-UP TOOL

[75] Inventors: Gary H. Beckley, Roseville; Walter W. Svendsen, New Brighton; Ronald B. Anderson, Plymouth, all of Minn.

[73] Assignee: Longyear Company, Minneapolis, Minn.

[21] Appl. No.: 48,489

[22] Filed: Jun. 14, 1979

[51] Int. Cl.³ .............................................. B25B 17/00
[52] U.S. Cl. ................................. 81/57.16; 81/57.18; 81/57.19
[58] Field of Search ................ 81/57.16, 57.14–57.22, 81/57.39, 57.34; 173/164; 166/77.5; 175/85

[56] References Cited

U.S. PATENT DOCUMENTS

| | | | |
|---|---|---|---|
| 2,174,115 | 9/1939 | Auld et al. | 173/164 |
| 2,332,685 | 10/1943 | Auld et al. | 81/57.16 |
| 2,668,689 | 2/1954 | Cormany | 81/57.16 |
| 3,722,603 | 3/1973 | Brown | 81/57.16 |
| 3,776,320 | 12/1973 | Brown | 81/57.18 |

*Primary Examiner*—James L. Jones, Jr.
*Attorney, Agent, or Firm*—Clayton R. Johnson

[57] ABSTRACT

A rod break-out and make-up tool for screwing and unscrewing drill rods that includes a lower clamp assembly having a jaw holder that has trunnions pivotally mounted on a mounting frame, and piston cylinder combinations pivotally mounted by the jaw holder for moving jaws divergingly upwardly to a rod release position and convergingly downwardly to a rod clamping position, a high-low drive assembly having a housing that rotatably mounts a spindle that has drive lugs, a lower ring gear fixed to the spindle and driven at a high speed, low torque by a reversible hydraulic motor, an upper ring gear rotatable on the spindle and driven by a piston cylinder combination operated rack, a ratchet assembly for transmitting a driving force from the upper gear to the lower gear in one angular direction and permitting the lower gear rotating relative thereto in said one direction, legs pivotally mounted on the trunnions for supporting the drive assembly, and adjustment mechanism connected between the frame and the housing for retaining the housing in selected adjusted pivoted positions; and an upper clamp assembly having an annular piston combination for moving jaws radially inwardly to a rod clamping position, a driven member driven by said lugs and axially movable relative thereto for rotating said mechanism, and a coil spring between the upper clamp assembly and a ring joined to said lugs to permit self centering of the upper clamp assembly and support the upper clamp assembly.

20 Claims, 9 Drawing Figures

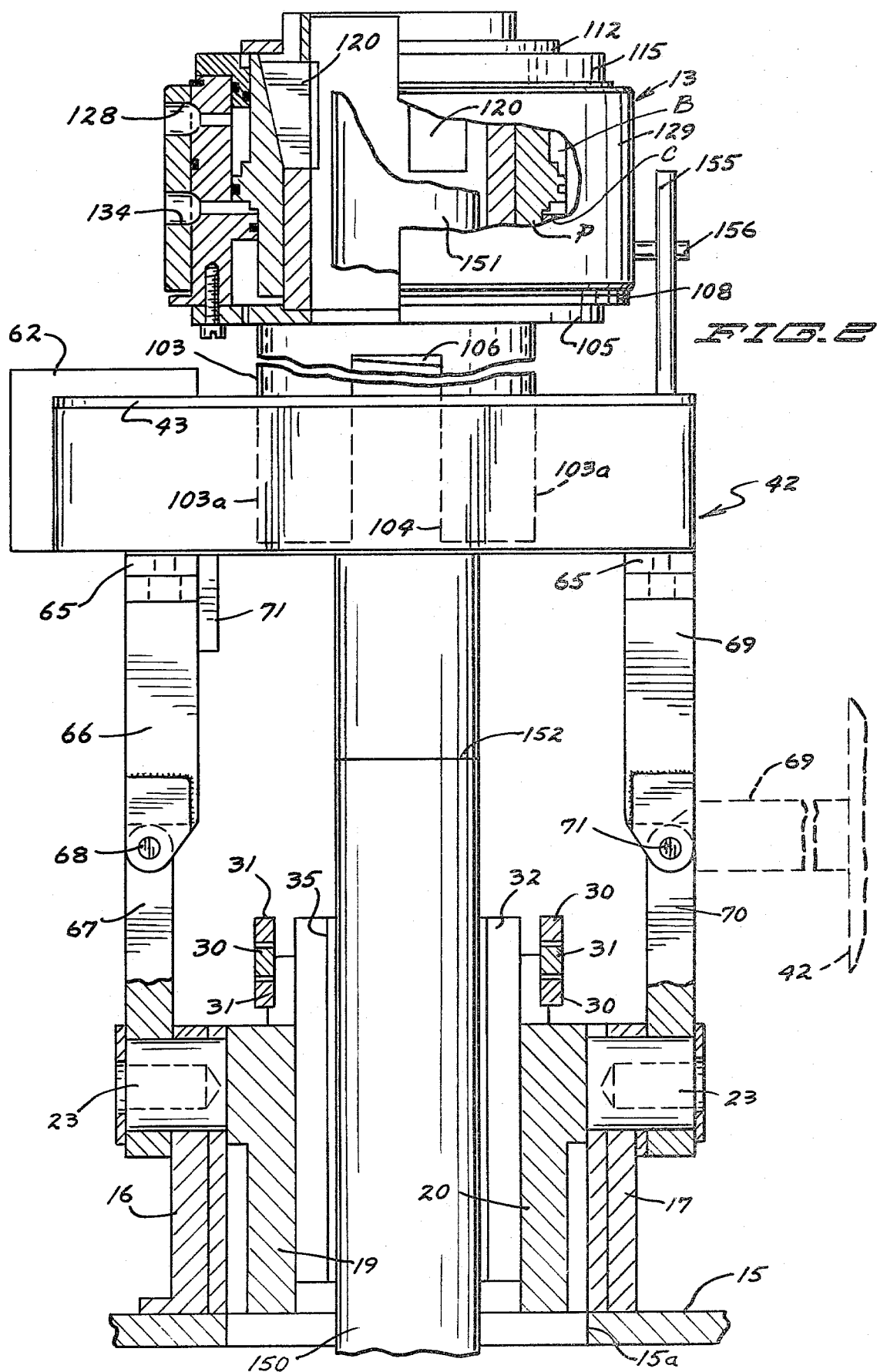

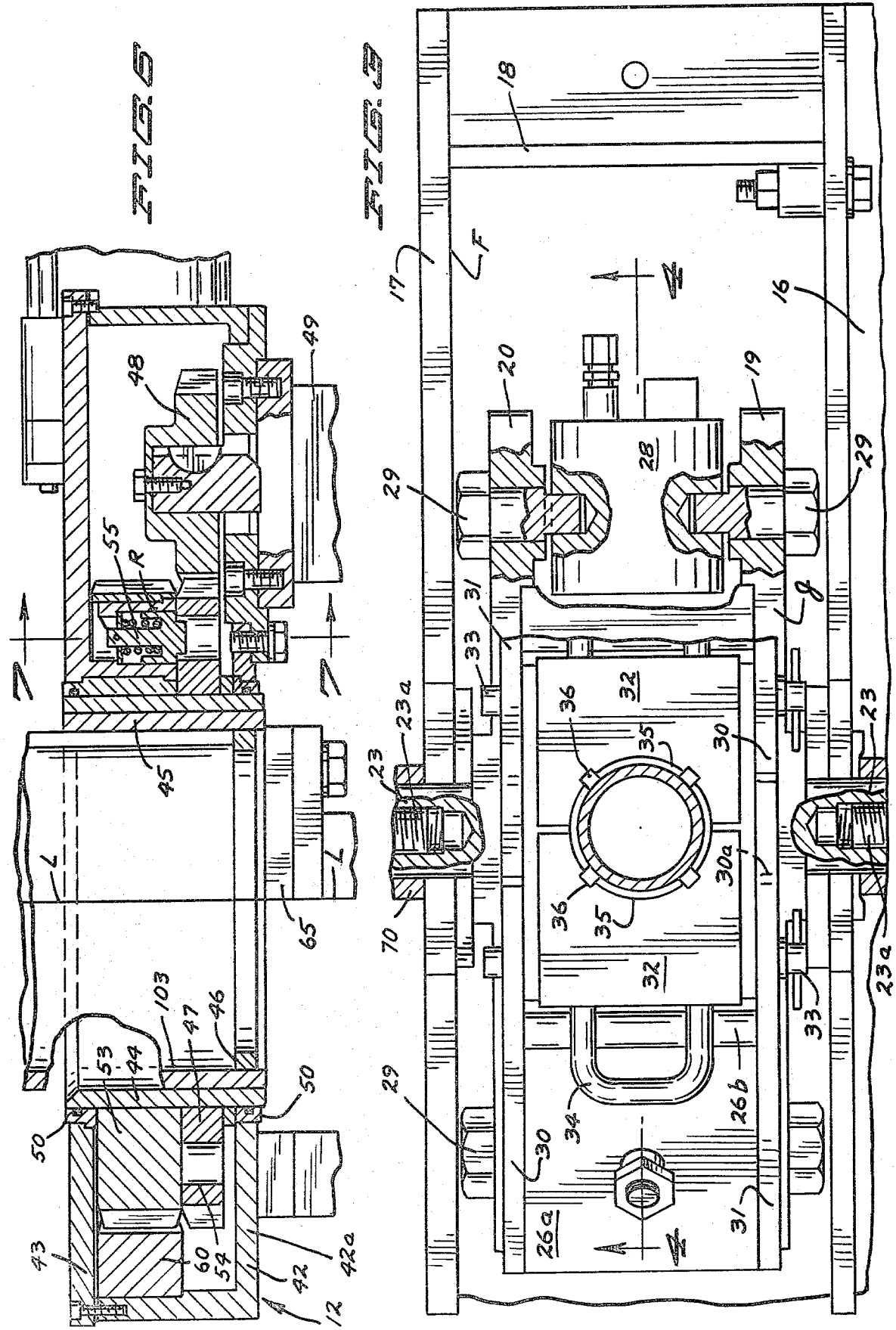

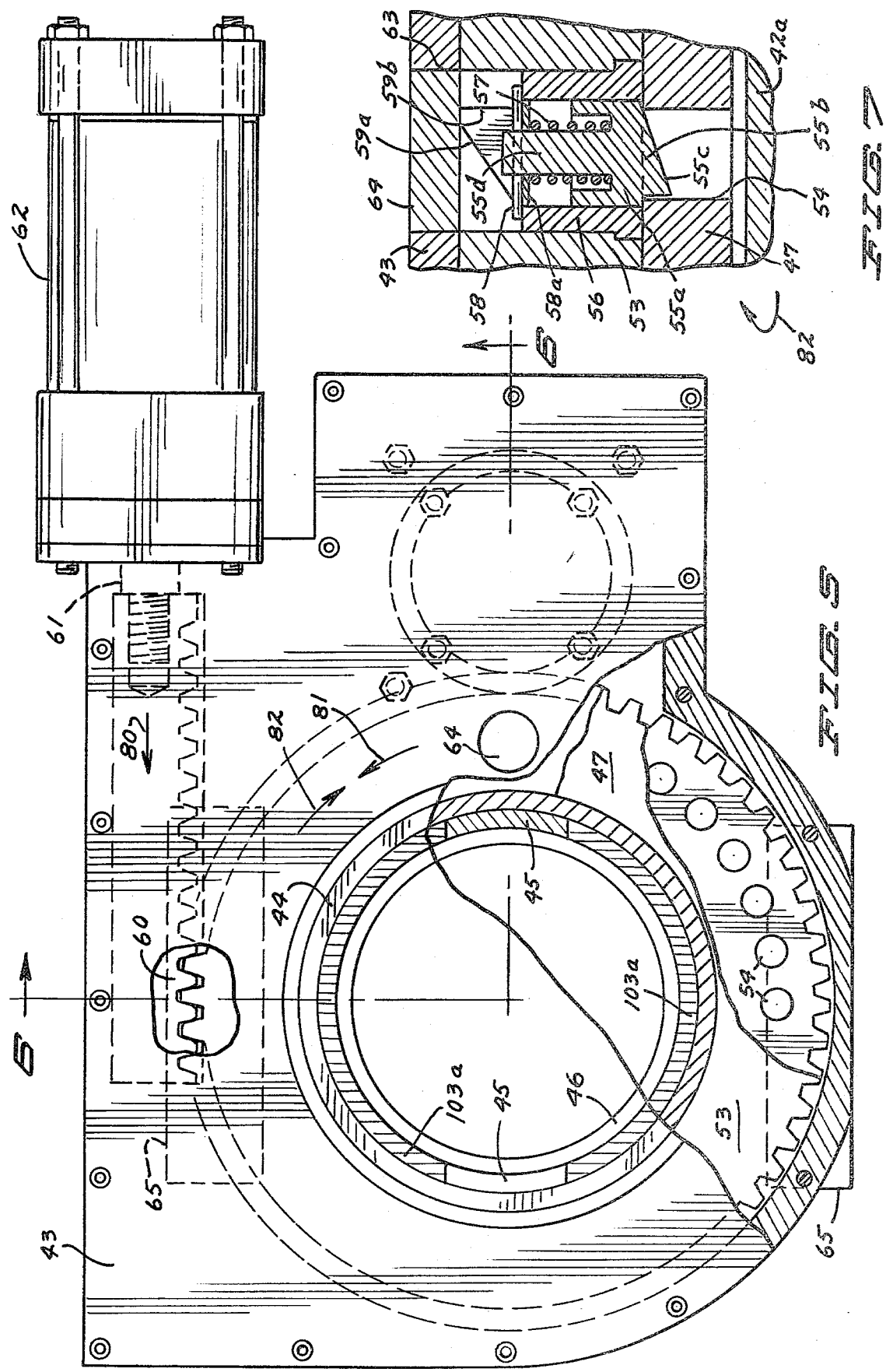

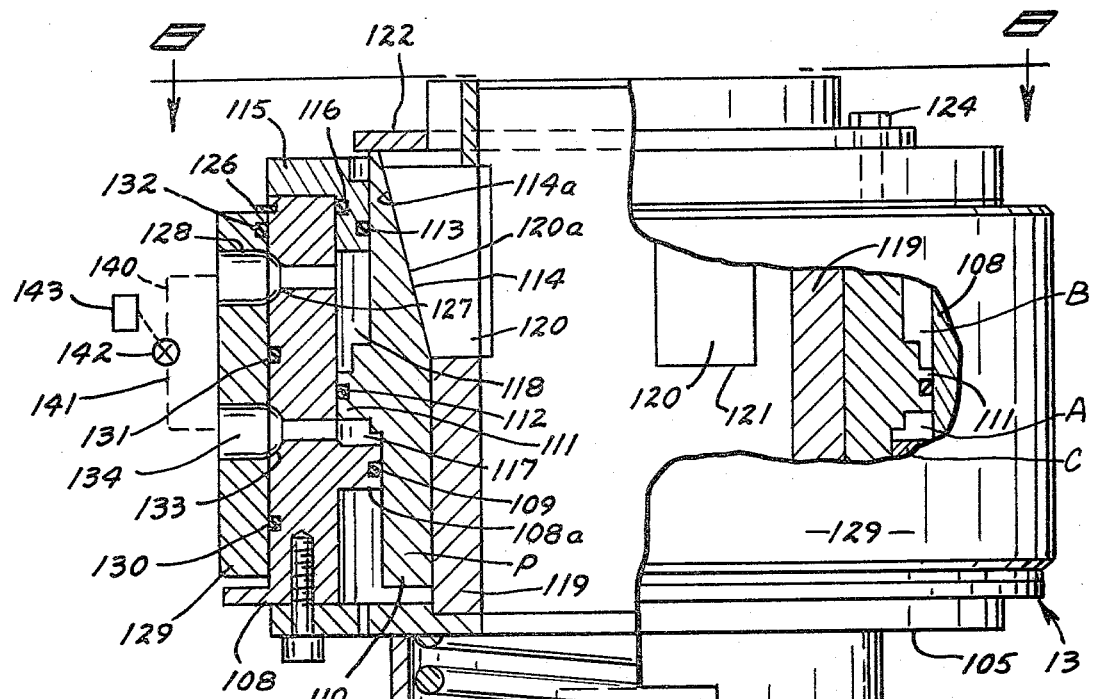
FIG. 9
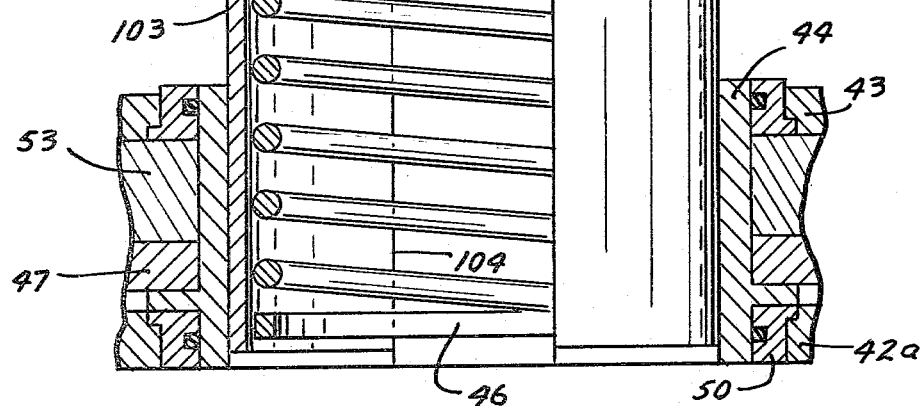
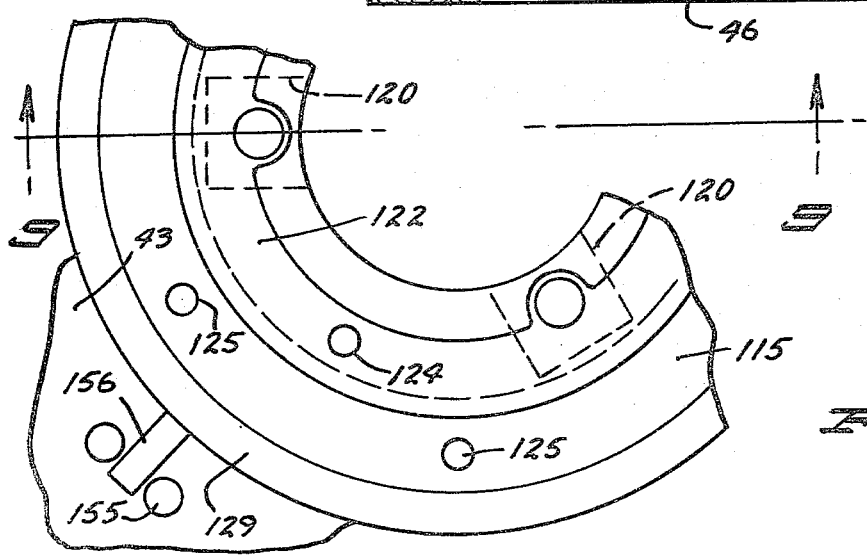
FIG. 8

ROD BREAK-OUT AND MAKE-UP TOOL

BACKGROUND OF THE INVENTION

A tool for clamping drill rods and threadingly connecting drill rods, or disconnecting threaded rod joints.

In U.S. Pat. No. 3,708,020 to Adamson there is disclosed a feed head assembly for coupling and uncoupling drill rods, said assembly including a centrally located supporting structure mounted on a vertical trunnion. The supporting structure mounts an upper chuck component, a lower chuck component, and a hydraulic motor for rotating each of the chuck components. The chuck components include hydraulically actuated jaws for clampingly engaging drill rods.

In U.S. Pat. No. 2,668,689 a pair of trunnions support an upper gripping unit for grippingly engaging and turning an upper pipe and a lower gripping unit dependingly mounted on the upper gripping unit for gripping a lower pipe.

U.S. Pat. No. 2,332,685 to Auld et al discloses a tube make-up device that includes a slip mechanism mounted on a cross-head that is dependingly mounted on a base plate by hydraulic cylinder, a driven rotary table on base plate and vertically movable automatic chuck mechanism driven by the rotary table.

In order to make improvements in a tool for making up and breaking out rod joints, this invention has been made.

SUMMARY OF THE INVENTION

A rod make-up and break-out tool which includes a lower clamp assembly that has a jaw holder with oppositely disposed trunnions pivotally mounted by a frame, jaws on the jaw holder that are hydraulically actuated between a rod clamping and a rod release position, and an upper clamp assembly for clampingly engaging a rod, and a drive unit mounted on the jaw holder for drivingly rotating the upper clamp assembly and supporting the upper clamp assembly.

One of the objects of this invention is to provide new and novel power operated means for grippingly engaging adjacent rods and selectively making and breaking a rod joint. Another object of this invention is to provide new and novel means for mounting upper and lower clamp assemblies and drivingly rotating one of the clamp assemblies.

A further object of this invention is to provide new and novel means for making up and breaking out rod joints of drill strings that extend vertically, or at an angle thereto, and that is mountable on a horizontal platform or support. A still further object of this invention is to provide in a rod make-up and break-out tool having an upper clamp assembly and a lower clamp assembly, new and novel means for drivingly rotating the upper clamp assembly and transmitting the torque required to rotate the rod clamped by the upper clamp assembly to the lower clamp assembly.

Another object of this invention is to provide in a rod make-up and break-out tool new and novel drive and mounting means for jaw mechanism for compensating for thread pitch when making up or breaking out a rod joint. A further object of this invention is to provide new and novel means for clampingly engaging a rod and initially drivingly rotate the clamped rod at a high torque, low speed and thence at a low torque, high speed for rod joint breaking, and alternately at a low torque, high speed and thence at a high torque, low speed to threadingly couple a pair of rods.

BRIEF DESCRIPTION OF THE DRAWINGS

FIG. 1 is a side view of the apparatus of this invention;

FIG. 3 is an enlarged plan view of the lower clamp assembly, said view being generally taken along the line in the direction of the arrows 3—3 of FIG. 1, and having parts broken away to illustrate other structural features;

FIG. 5 is a plan view of the drive assembly with parts thereof being broken away to illustrate the structure therebeneath, said view being generally taken along the line and in the direction of the arrows 5—5 of FIG. 1;

FIG. 6 is a vertical cross-sectional view generally taken along the line and in the direction of the arrows 6—6 of FIG. 5;

FIG. 7 is an enlarged vertical cross-sectional view of the poppet assembly in a position for transmitting a driving force from the upper ring gear to the lower ring gear in one angular direction;

FIG. 8 is a fragmentary plan view of the upper clamp assembly and the drive assembly, said view being generally taken along the line and in the direction of the arrows 8—8 of FIG. 9; and FIG. 9 is in part a vertical cross section view of the upper clamp assembly and the adjacent part of the high-low drive assembly, and in part a side view, the part in cross section being generally taken along the line and in the direction of the arrows 9—9 of FIG. 8.

Figure 2:
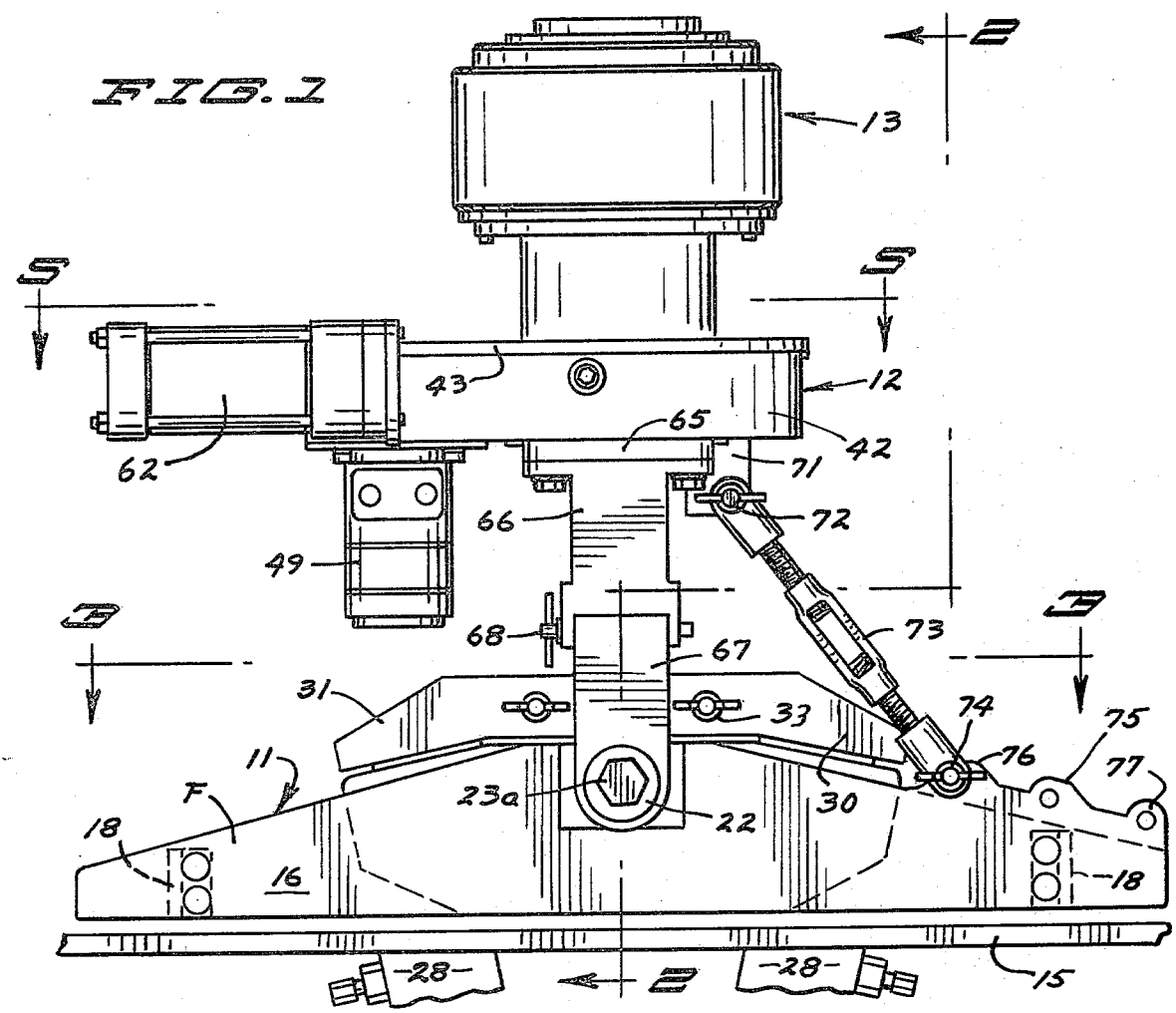
FIG. 2 is in part an end view and in part a vertical cross-sectional view of the apparatus of this invention, the part of the view shown in cross section being generally taken along the line and in the direction of the arrows 2—2 of FIG. 1.

Referring now in particular to FIGS. 1 and 2, the apparatus of this invention, generally designated 10, includes a lower clamp assembly, generally designated 11, a high-low drive assembly, generally designated 12, and a upper clamp assembly, generally designated 13. The lower clamp assembly 11 includes a frame F that is bolted or otherwise suitably secured to a platform 15. The frame F includes longitudinally elongated frame side walls 16 and 17, and end walls 18 that are secured to one another to enclose a generally rectangular space.

Mounted by the frame to extend within the rectangular space is a jaw holder J that has jaw holder side walls 19 and 20, each of which has laterally spaced upwardly diverging slots 21 and 22 that open toward the slots of the other side wall. Transversely outward extending trunnions 23 are secured to the sidewalls 19 and 20 for mounting the jaw holder on the frame to pivot about a lateral horizontal axis. Extended between the sidewalls are longitudinally spaced, upwardly diverging end walls 24 and 25 that extend between the side walls and are mounted adjacent slots 21 and 22 respectively.

Figure 4:
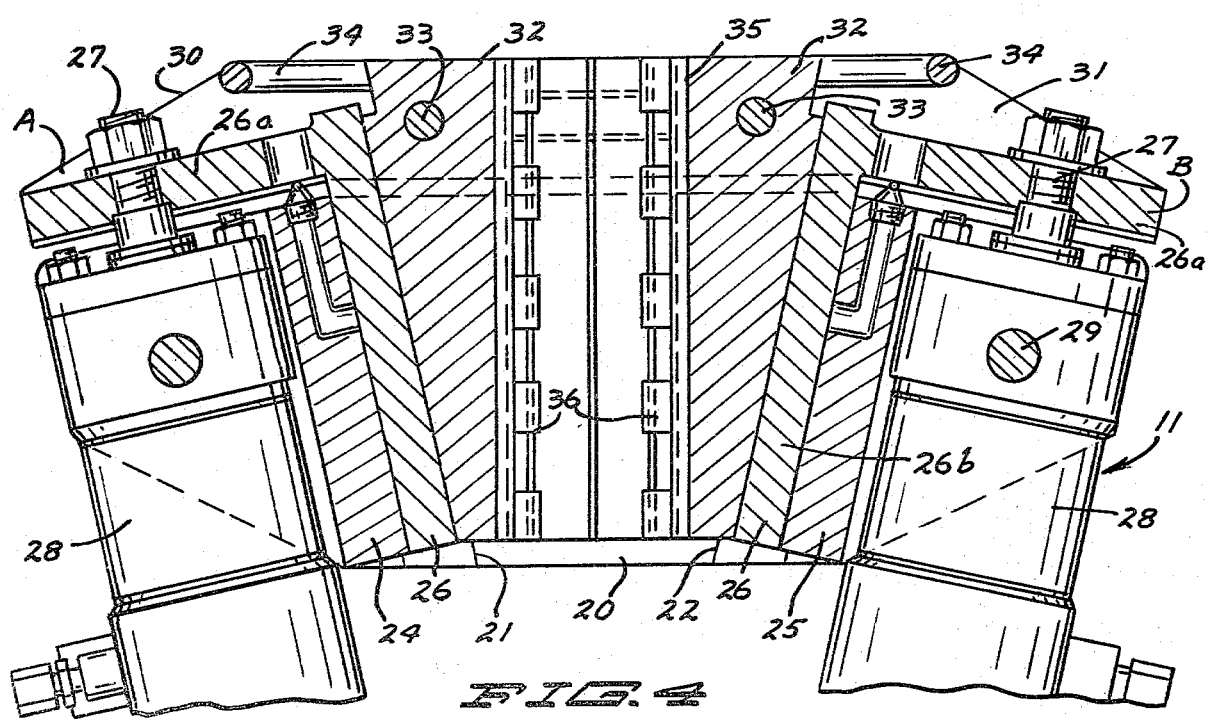
FIG. 4 is a longitudinal vertical cross-sectional view of a portion of the lower clamp assembly, said view generally taken along the line and in the direction of the arrows 4—4 of FIG. 3.

Mounted on the jaw holder are a pair of jaw actuators, designated A and B respectively, each of which includes a right angle bracket 26. The bracket 26 of actuator A includes an upwardly and outwardly extending leg 26b that has transverse outer end portions extended into slot 21 and is in sliding abutting relationship with end wall 24. The upper end of leg 26b has one end of a predominately horizontally extending leg 26a secured thereto, a piston rod 27 of a combination 27, 28 being secured to leg 26a. The cylinder 28 of combination 27, 28 has oppositely disposed trunnions 29 pivotally mounted by the jaw holder side walls 19, 20 on the opposite side of end wall 24 from bracket leg 26b. Jaw actuator B, which is of substantially the same construction as actuator A, includes a right angle bracket having a predominately vertically extending leg 26b that has transverse outer end portions slidably extended into slot 22 and is in slidably abutting relationship to end wall 25. Leg 26a of actuator B extends in right angular relationship to wall 25 and is secured to the piston rod 27 of the piston cylinder combination 27, 28. The cylinder 28 of the combination 27, 28 has trunnions 29 pivotally mounted by jaw holder side walls 19, 20 on the opposite side of end wall 25 from bracket leg 26b. As may be noted from FIG. 4, the piston rods are elongated to extend upwardly in diverging directions and parallel to the adjacent one of the end walls 24, 25 respectively. Bracket leg 26a of jaw actuator A extends between one set of side plates (walls) 30, 31 and is secured thereto while the leg 26a of actuator B extends between and is secured to another set of side plates (walls) 30, 31. Plates 30 extend toward the side plates 31 and have longitudinally extending protrusions 30a extending into slots of plates 31 such as more fully described in co-pending application Ser. No. 048,488, filed June 14, 1979, to permit the jaws moving horizontally relative one another, but maintain them at about the same elevation.

A jaw 32 has a pin 33 extended therethrough to pivotally mount the jaw on one set of side walls 30,31 and moves therewith while an oppositely faced second jaw 32 is pivotally mounted by a pin 33 which in turn is mounted by the other set of side walls 30, 31 to move therewith. The pins are extended through slightly enlarged apertures so that tapered surfaces of the jaws remain in abutting relationship with the planar surfaces of legs 26b. The adjacent vertical surfaces of the jaws have semi-cylindrical recesses 35 formed therein that open toward the recess of the other. Hardened inserts 36 are mounted in the walls defining the recesses 35 for grippingly engaging a drill rod when the jaws are moved to their drill rod clamping position.

The high-low drive assembly 12 includes a housing 42 having a bottom wall 42a and a removable top cover 43. The cover and bottom wall have aligned apertures that mount bearing 50 which in turn rotatably mount an annular spindle 44. The inner circumferential wall of the spindle mounts axially elongated lugs 45 to extend radially inwardly thereof, the lugs in turn mounting a ring 46. The ring 46, lugs 45 and the spindle provide diametrically opposed arcuate spaces to have the driven member portions 103a of the upper clamp assembly extended thereinto to be drivenly rotated and at the same time to be axially movable relative thereto.

A lower ring gear 47 is keyed to the spindle and extends radially outwardly thereof in underlying relationship to an upper ring gear 53 which is mounted for rotation relative the spindle. The lower ring gear is in driven relationship to a pinion 48 that is secured to the motor shaft of hydraulic motor 49 to rotate therewith. The hydraulic motor is of a reversible type, and is dependingly mounted by the housing wall 42a, and provides a low torque, high speed drive.

The lower ring gear is provided with a plurality of circumferential speed axial apertures 54 that are of the same diameter and equally radially spaced from the axis of rotation L—L of the spindle. The upper ring gear is provided with an axially extending aperture having a ratchet (poppet) assembly R mounted thereon.

The ratchet assembly includes a plunger housing mounted in the last mentioned aperture, the plunger housing 56 mounting a plunger 55 for axial movement relative thereto. The plunger includes a main body portion 55a of a larger diameter than that of an aperture 54, a cammed surface portion 55b that is extendable down into an aperture 54 and has a generally planar tapered surface 55c that when the upper ring gear is rotated in one angular direction relative the lower ring gear, the cammed surface will move up on the lower ring gear to force the cammed surface portion out of aperture 54; and when driven in the other angular direction, will form a driving connection from the upper ring gear to the lower ring gear.

Further, the plunger has a reduced diameter portion 55d on which there is mounted a coil spring 57 that resiliently urges the plunger axially downwardly, the upper end of the coil spring abutting against a washer 58a that seats against a downwardly facing shoulder of the plunger housing. A pin 58 is mounted by the reduced diameter portion and extends in oppositely disposed notches that are formed by vertical walls 59b of the plunger housing and the planar walls 59a that are tapered upwardly and away from the adjacent vertical wall. As a result, when the plunger is in the one rotated position such as shown in FIG. 5, and the upper ring gear is driven in one angular direction, the plunger will form a drive connection from the upper ring gear to the lower ring gear, but will not drive the lower ring gear when the upper ring gear is rotated in the opposite angular direction. However, by lifting up on the pin 58 so that it is located above the notches in the plunger housing and rotating the pin 58 180° about the plunger axis, the plunger is rotated to a position such that when the upper ring gear is rotated in said one angular direction, it will not form a driving connection to the lower ring gear, but when the upper ring gear is rotatably drivenly rotated in the opposite angular direction, the plunger will move into the aperture 54 and provide a driving connection from the upper ring gear to the lower ring gear.

For drivingly rotating the upper ring gear at a high torque, lower speed there is provided a piston cylinder combination 61, 62 that includes a cylinder 62 bolted to the housing. The piston rod 61 is extended into the housing and is attached to an elongated rack 60 which has teeth in intermeshing driving relationship to the gear teeth of the ring gear 53.

Thus when fluid under pressure is applied to one end of the cylinder, the rack 60 is moved in the direction of arrow 80 to drivingly rotate the upper ring gear in the direction of arrow 81, and when fluid under pressure is applied to the opposite end of the cylinder, the rack is translated in a direction opposite arrow 80 to drivingly rotate the upper ring gear in the direction of arrow 82.

A more detailed description of the drive assembly may be found in co-pending application Ser. No. 48,490, filed June 14, 1979, assigned to the same assignee of this application and accordingly the structure thereof will not be set forth in great detail in this application.

In order to mount the assembly 12, there is provided a pair of bars 65 (one on either side of the bottom wall aperture). To each bar there is dependingly secured an upper arm member 66, 69 respectively. The lower end of the arm member 66 mounts a pivot pin 68 that in turn is pivotally connected to the upper end of a lower arm member 67. The lower arm member 67 is pivotally mounted on one of the trunnions 23 while the lower arm member 70 likewise has its lower end pivotally mounted on the other trunnion 23 to extend radially therefrom in the same direction that arm member 67 extends from the one trunnion. The upper end of arm 70 is pivotally connected to the lower end of arm 69 by a pivot pin 71. The pivot axes of pivot pins 68, 71 are parallel to one another, located on opposite sides of a drill rod clamped by the clamp of assembly 11 and extends perpindicular to the pivot axis of trunnion 23 and radially spaced therefrom.

The axis of rotation of the spindle of the drive assembly 12 is co-extensive with the central axis of the jaw holder when the upper arms are pivotally connected to the lower arms by pivot members 68,71 and an appropriate adjustment is made. In order to hold the drive assembly and jaw holder in selected adjusted positions there is provided a turn buckle 73 that has one end pivotally connected by a pivot pin 74 to one of the protrusions 75, 76, 77 on the side wall 16. As may be noted from FIG. 1, the protrusions are of different longitudinal spacings from the trunnion 23. The opposite end of the turn buckle is pivotally connected by pivot pin 72 to the lug 71 that is dependingly mounted by the housing. The pivot axes of pivot pins 72, 74 are parallel to the pivot axis of the trunnions 23. With the pivot pins 72, 74 in place and by adjusting the turn buckle, the angle of the arms relative to the vertical will be varied and thereby the central axis of the upper clamp assembly and the high-low drive assembly will likewise be varied. If a greater adjustment of angle is required that can be obtained by adjustable threading of the turn buckle, the pivot pin 74 may be removed and extended into the adjacent protrusion, for example protrusion 75, and the effective length of the turn buckle again adjusted.

Referring now in particular in FIGS. 2, 8 and 9, the upper clamp (chuck) assembly 13 includes a drive tube 103 having diametrically opposite, downwardly opening slots 104 to provide drive members 103a. The upper end of tube 103 is welded to an annular end wall 105. The clamp assembly 13 is spring-centered for proper joint thread engagement or disengagement without galling threads, there being provided a coil spring 106 in the drive tube that has one end abutting against ring 46 and an opposite end abutting against end wall 105.

A cylinder outer sleeve 108 is bolted to end wall 105 to extend thereabove, sleeve 108 having an axially intermediate, radially inwardly extending flange 108a. An O-ring 109 is mounted in a groove in flange 108a to form a fluid seal with the lower portion 110 of the annular piston P. Piston P has an axially intermediate, radially outwardly extending flange 111 that is above flange 108a. Flange 111 has a groove mounting an O-ring 112 to form a fluid seal with the outer sleeve. The upper end portion of the piston is in fluid sealing relationship with an O-ring 113 that is mounted in a groove of the upper annular end wall 115 which is bolted to outer sleeve 108 at 125. Thus an upper cylinder chamber 118 is defined by end wall 115, piston flange 111 and the parts of the outer sleeve 108 and piston portion 114 that are axially between wall 115 and piston flange 111; while a lower cylinder chamber 117 is defined by piston flange 111, sleeve flange 108a and the parts of the outer sleeve 108 and piston portion 110 that are axially between flanges 108a, 111.

An annular jaw mount 119 is located within the piston and has its lower end welded to the lower end wall 105. The jaw mount has a plurality of jaw slots 121, for example three, that extend radially therethrough and open to the tapered surfaces 114a of piston portion 114. A jaw 120 is mounted in each jaw slot and has a surface 120a of a taper opposite that of the respective surface 114a that is abuttable thereagainst. A retainer ring 122 is secured to the piston by a plurality of cap screws 124.

An outer collector ring 129, which forms a rotary hydraulic swivel joint, is mounted on the outer sleeve 108, a snap ring 126 mounted by the outer sleeve being abuttable against the upper end of the collector ring while the lower end of the collector ring is abuttable against an enlarged diameter flange of the outer sleeve. The collector ring has a port 128 that opens to an annular groove 127 of the outer sleeve which in turn opens through a port to the upper chamber 118. The collector ring also has a port 134 which opens to an annular groove 133 of the outer sleeve that in turn opens through a port to the lower chamber 117. On axial opposite sides of groove 133, the outer sleeve has grooves mounting O-rings 130 and 131 respectively in fluid sealing relationship with the collector ring while the collector ring has a groove mounting an O-ring 132 to be in fluid sealing relationship with the outer sleeve on the axial opposite side of groove 127 from O-ring 131. With the above sealing arrangement all sealing surfaces of the upper clamp assembly either rotate in a circumferential mode or act in an axial mode, but in no case is both combinations required from the same sealing surface.

A line 140 is connected to port 128 while a line 141 is connected to port 134. Lines 140, 141 are connected through conventional valving structure 142 to a source of fluid under pressure 143 whereby when fluid under pressure is applied through line 141, fluid from chamber 118 exhausts through line 140 and when fluid under pressure is applied through line 140, fluid from chamber 117 exhausts through line 141.

When the driven member 103 is driveningly rotated the outer sleeve, the jaws 120, the piston and the jaw mount rotate therewith and rotate relative the collector ring. The collector ring is suitably restrained against rotary movement while permitting axial movement thereof with the outer sleeve. For example, two vertical rods 155 have their lower ends fixed to the cover 43 (or part of the housing 42) and a lug 156 is fixed to the collector ring to extend radially outwardly thereof and between rods 155 to prevent any significant rotary movement of the collector ring.

In using the apparatus of this invention, the jaw holder J and the legs 66, 67 are pivoted about the pivot axis of the trunnions 23 so that the central axis of the jaw holder, the spindle 44 and the annular jaw mount 119 will be aligned with the central axis of the core drill hole (drill string). Then then the bolts 23a may be tightened to force washers 22 against legs 66, 70 which bear against frame members 16, 17 to retain trunnions 23 in a fixed position relative the frame members whereby the jaw holder and the legs are retained in the proper pivoted position relative the platform 15. The turn buckle is adjusted to the appropriate length and the one of the pins 72,74 that was removed is reinserted to aid in holding the drive assembly in the adjusted pivoted position. Alternately the turn buckle can be adjusted to hold the drive assembly in an adjusted pivoted position and then the bolts 23a tightened to hold the jaw holder in an adjusted pivoted position, it being understood that the lower clamp assembly can be used without the bolts 23a tightened sufficiently to retain the jaw holder in a fixed pivoted position.

Advantageously the above adjustments are made after a drill rod is extended through the clamp assemblies and the jaws thereof moved to their rod clamping positions.

Assuming a rod is to be unthreaded from a drill string, the drill string is hoisted up by conventional hoist apparatus to a position the rod joint is between the jaw holder and the housing 42, jaws 32 and 120 being in their unclamping position at this time. Now fluid under pressure is applied to the upper ends of cylinders 28 whereby brackets 26 are moved axially downwardly and transversely toward one another to move the jaws 32 in the same directions to a position to clampingly engage rod 150. Then the hoist rope (cable) is slackened and the lower clamp assembly 11 holds the drill string to keep it from falling down the drill hole. It is noted that the weight of the drill string being supported by jaws 32 acts to move the jaws downwardly and thus the heavier the load of the drill string, the greater the clamping force.

Thereafter, with the driven members 103a extending downwardly between the upper clamp assembly spindle 44 and ring 46 and the drive lugs 45 extended into notches 104, fluid under pressure is applied to port 134. As a result piston P moves upwardly, and due to the tapered surfaces 114a, 120a of the piston and the jaws, and the jaw mount 119 preventing any significant axial movement of the jaws relative to the outer sleeve 108, the jaws are moved radially inwardly to clampingly engage drill rod 151.

The ratchet member 55 is set such that the part of the pawl portion that extends axially the furtherest away from the main body portion 55a is located in a counter-clockwise direction relative the remainder of the pawl portion. Now the motor 49 is actuated for driving gear 47 in the direction of arrow 81. In the event the torque required to initially break the rod joint is too high, fluid under pressure is applied to cylinder 62 to move rack 60 in the direction of arrow 80. This rotates gear 53 in the direction of arrow 81. If not already extending into an aperture 54, as soon as gear 53 is rotated to a position that pawl portion 55b is resiliently urged into an aperture 54, gear 47 is drivenly connected to gear 53 to rotate therewith. This results in spindle 44 and the lugs 45 being drivenly rotated in the direction of arrow 81 whereby the upper clamp assembly driven members 103a are rotated in the same direction.

Drivingly rotating driven member 103 rotates the cylinder sleeve 108, the jaw mount 119 and the jaws 120 therewith, the jaws in turn rotating the rod 151 in an unthreading direction. It is to be noted that outer collector ring does not rotate with the cylinder sleeve, but is free to move axially therewith.

In the event at the end of the piston stroke in the direction of arrow 80 the torque required to turn rod 151 relative to rod 150 is still too high for motor 49, rack 60 is retracted (translated in the direction opposite arrow 80) whereby gear 53 is rotated in the direction of arrow 82. However, gear 47 does not rotate therewith since due to the angle of taper of surface 55c the plunger is cammed out of each successive aperture 54 that pawl portion 55b moves into. The axial movement of plunger 55 during the time pawl portion is cammed out of apertures 54 is not sufficiently great that the plunger can rotate 180° relative housing 56, the pin 58 remaining in the notches 59a, 59b in the same angular orientation that it was last set in. Thence the cylinder 62 is again pressurized to rotate gear 53 in the direction of arrow 81. As soon as the torque requirements for unthreading rod 151 are sufficiently low that motor 49 can rotate gear 47, gear 47 is rotated at a higher speed than gear 53 (gear 53 either still being rotated by rack 60 or being stationary). Gear 47 in being driven at a higher speed than gear 53 results in the pawl portion 55b being cammed out of successive apertures 54. Thus piston cylinder combination 61, 62 is used for providing a high torque, low speed to initially break a rod joint (if necessary) and thereafter motor 49 provides a high speed, low torque to complete the unthreading of the rod joint. The torque required to unthread the rod is totally transmitted through legs 66, 67, 69, 70, no external force being required to withstand the unthreading torque.

Due to the pitch of the threads of the rod joint, rod 151 is moved axially upwardly relative rod 150. Such movement is permitted due to driven members 103a being axially movable relative the drive lugs. The relative axial lengths of the drive lugs and the driven members are such that lugs remain in driving relationship to the driven members during the complete unthreading (also threading) of a rod joint.

When the rod 151 is completely unthreaded motor 49 is stopped, fluid under pressure is applied to port 128 whereby the piston P moves downwardly and jaws 120 are resiliently moved to a release position, the hoist mechanism is operated to move rod 151 away from the apparatus of this invention, and thereafter rod 151 is stacked. At the time jaws 120 move to their release position the upper clamp assembly moves axially downwardly to the position it had relative the drive assembly prior to the starting of the unthreading of rod 151 from rod 150 to be ready for unthreading the next joint.

Thence the hoist rope is attached to rod 150, and fluid under pressure applied to the lower ends of cylinders 28 to move the jaws 32 upwardly and away from one another whereby the total weight of rod 150 and the rods attached thereto (not shown) are supported by the hoist rope. The hoist then raises the drill string until the next rod joint to be broken is vertically between jaws 32 and jaws 120, after which fluid under pressure is applied to the upper ends of cylinders 28 to move the jaws 32 to their rod clamping position. The above process is repeated until the drill string is removed from the drill hole. To insert the rods back into the drill hole, the reverse of the above break out procedure is repeated. During a threading operation, the upper clamp assembly can move downwardly with spring 104 being compressed.

After a joint breaking operation and prior to use of the drive assembly for a joint make up operation, plug 64 is removed from closure aperture 63, gear 53 is rotated to a position that plunger 55 is axially beneath aperture 63; and pin 58 is moved axially relative the plunger housing to be above housing surfaces 59a, 59b, then rotated 180° and thence allowed to be resiliently returned to extend in the apexes formed by surfaces 59a, 59b. As a result the ratchet member 55 is set such that the part of the pawl portion that extends axially the furtherest away from the main body portion 55a is located in a clockwise direction relative the remainder of the pawl portion. When motor 49 is actuated, it is actuated for driving the gear 47 in the direction of arrow 82.

If for some reason it is desired to use only the lower clamp assembly, at a time no rod is extending between legs 66, 69, one of the pins 68 and 71 can be removed and the housing 42 pivoted about the other of pins 68 and 71 so that the housing is off to one side of the drill hole. For example, the housing can be pivoted about pin 71 to an out of way position such as fragmentarily shown in dotted lines in FIG. 2. Prior to pivoting the housing about one of pins 68,71 the upper clamp assembly and spring 106 are removed by lifting them vertically upwardly relative to spindle 44 whereby the upper clamp assembly is separated from the drive assembly 12.

What is claimed is:

1. Apparatus for making up and breaking out a joint of a first drill rod and a second drill rod comprising a jaw holder having a pair of oppositely disposed trunnions, a base for engaging a supporting surface and pivotally mounting the trunnions to support the jaw holder, jaws mounted by the holder for movement between a position to clampingly engage the first drill rod to hold the first drill rod in a stationary position, and a release position, jaw actuator means mounted by the jaw holder for moving the jaws between their clamping and release positions, means for clampingly engaging the second drill rod and drivingly rotating the second drill rod, and means mounted on the jaw holder for supportingly mounting the second drill rod engaging means in substantial spaced relationship to the jaw holder.

2. The apparatus of claim 1 further characterized that that jaw holder has an opening extending therethrough that has a central axis, that the jaw actuator means includes means for moving the jaws toward and away from the central axis as the jaws are moved between their clamping and release positions, and that the trunnions have a common pivot axis that is perpendicular to the central axis, are on opposite sides of the central axis and are substantially aligned therewith.

3. The apparatus of claim 1 further characterized in that the drivingly rotating means includes a housing and that the means for mounting the drivingly rotating means comprises first and second arm members that each has a first end portion attached to the jaw holder and a second end portion fixedly attached to the housing.

4. The apparatus of claim 3 further characterized in that each of the arm members has disengagable pivotally connected intermediate portions.

5. The apparatus of claim 1 further characterized in that the jaw holder has an opening extending therethrough that has a central axis, and that the drivingly rotating means includes a housing having oppositely disposed walls that have apertures axially aligned with said central axis, a ring gear, means for mounting the ring gear in the housing in axial alignment with the apertures for rotation and being drivenly rotated by the ring gear, means mounted on the housing for drivingly rotating the ring gear, and a drive member mounted by the ring gear mounting means for being rotated therewith.

6. The apparatus of claim 5 further characterized in that said drivingly rotating means includes a chuck assembly for drivingly rotating the second drill rod, the chuck assembly including a chuck housing, a plurality of chuck jaws, operable means on the chuck housing for moving the chuck jaws between a second drill rod clamping position and a release position, and drivingly rotating the chuck jaws, and means axially movable relative the ring gear and in abutting relationship with the drive member for being rotated thereby to operate the operable means to rotate the chuck jaws when the ring gear is drivenly rotated.

7. The apparatus of claim 1 further characterized in that the jaw actuator means includes power means mounted on the jaw holder and connected to the jaws for moving the jaws between their clamping and release positions.

8. Apparatus for making up and breaking out a joint of a first drill rod and a second drill rod comprising a base, a clamp assembly mounted on the base for clampingly engaging the first drill rod to hold it stationary, a chuck assembly for clampingly engaging the second drill rod and drivingly rotating it, said chuck assembly including a chuck housing, a plurality of chuck jaws, operable means on the chuck housing for moving the chuck jaws between a release position and a second drill rod clamping position and drivingly rotating the chuck jaws, and a drivable member connected to the operable means for operating the operable means to rotate the chuck jaws when the drivable member is drivenly rotated, a drive assembly that includes a housing having oppositely disposed walls that have axially aligned apertures for one of the drill rods to extend through, ring gear means rotatably mounted on the drive assembly housing in axial alignment with said apertures for drivingly rotating said drivable member and permitting free axial movement of the drivable member relative thereto, and power operated means mounted on the drive assembly housing for drivingly rotating said ring gear means, and means joined to the drive assembly housing for mounting the drive assembly on the clamp assembly in substantial spaced relationship thereto.

9. The apparatus of claim 8 further characterized in that the clamp assembly has oppositely disposed trunnions pivotally mounted by the base.

10. Apparatus for making up and breaking out a joint of a first drill rod and a second drill rod comprising a base, a clamp assembly mounted on the base for clampingly engaging the first drill rod to hold it stationary, a chuck assembly for clampingly engaging the second drill rod and drivingly rotating it, said chuck assembly including a chuck housing, a plurality of chuck jaws, operable means on the chuck housing for moving the chuck jaws between a release position and a second drill rod clamping position and drivingly rotating the chuck jaws, and a drivable member connected to the operable means for operating the operable means to drivingly rotate the chuck jaws when the drivable member is drivenly rotated, a drive assembly that includes a housing having oppositely disposed walls that have axially aligned apertures for one of the drill rods to extend through, ring gear means rotatably mounted on the drive assembly housing in axial alignment with said apertures for drivingly rotating said drivable member while permitting free axial movement of the drivable member relative thereto, and power operated means mounted on the drive assembly housing for drivingly rotating said ring gear means, and means joined to the drive assembly housing for mounting the drive assembly on the clamp assembly in substantially spaced relationship thereto, the drive assembly including a ring gear mounted on the ring gear means in axial alignment therewith for rotation relative thereto, means for providing a one-way driving connection between the ring gear and ring gear means, and second power operated means mounted on the drive assembly housing for drivingly rotating the ring gear, the first mentioned power operated means providing a relatively high speed, low torque drive in comparison to the second power operated means.

11. The apparatus of claim 10 further characterized in that the means joined to the drive assembly housing includes a pair of arm members that each has a first end portion pivotally attached to the clamp assembly and a second end portion fixedly attached to the drive assembly housing.

12. The apparatus of claim 11 further characterized in that each arm member has adjacent intermediate portions and a removable pivot pin for pivotally connecting its intermediate portions together.

13. The apparatus of claim 11 further characterized in that the clamp assembly includes a jaw holder having oppositely disposed trunnions pivotally mounted by the base and that the arm members first end portions are pivotally mounted on the trunnions to extend radially away therefrom.

14. The apparatus of claim 11 further characterized in that the clamp assembly includes a jaw holder having oppositely disposed trunnions mounted by the base for pivoted movement about a trunnion pivot axis, that the arm members are pivotally mounted on the trunnions, that each arm member has adjacent intermediate portions and a removable pivot pin for pivotally connecting its intermediate portions together, the pivot pins having pivot axes perpendicular to the trunnion pivot axis and radially spaced therefrom, and that there is provided means connected between the clamp assembly and one of the arm members and the drive assembly for retaining the drive assembly and arm members in selected adjusted pivoted positions relative to the base.

15. Apparatus for making up and breaking out a joint of a first drill rod and a second drill rod comprising a base, a clamp assembly mounted on the base for clampingly engaging the first drill rod, a chuck assembly for clampingly engaging the second drill rod and drivingly rotating it, said chuck assembly including a chuck housing, a plurality of chuck jaws, operable means on the chuck housing for moving the chuck jaws between a release position and a second drill rod clamping position and drivingly rotating the chuck jaws, and a drivable member connected to the operable means for operating the operable means to drivingly rotate the chuck jaws when the drivable member is being drivenly rotated, a drive assembly that includes a housing, drivable means rotatably mounted by the drive assembly housing to drivingly rotate the drivable member and permitting free movement of the drivable member relative thereto in a direction parallel to axis of rotation of the drivable member, and power operated means mounted on the drive assembly housing for drivingly rotating the drivable means, and leg means for mounting the drive assembly housing on the clamp assembly in substantial spaced relationship thereto and transmitting the torque required to make and break the rod joint from the drive assembly to the clamp assembly, the drive assembly housing being located between the clamp assembly and the chuck assembly housing.

16. The apparatus of claim 15 further characterized in that the clamp assembly includes a jaw holder pivotally mounted on the base and power operated jaw means mounted on the jaw holder for clampingly engaging the first drill rod, the leg means being pivotally mounted on the jaw holder, and that there is provided means connected between the base and one of the leg means and the drive assembly for retaining the drive assembly and leg means in selected adjusted pivoted positions relative the base.

17. Apparatus for making up and breaking out a joint of a first drill rod and a second drill rod comprising a frame, a jaw holder having oppositely disposed trunnions pivotally mounted by the frame, jaws mounted by the holder for movement between a position to clampingly engage the first drill rod to hold the first drill rod in a stationary position, and a release position, jaw actuator means mounted by the jaw holder for moving the jaws between the clamping and release positions means, for clampingly engaging the second drill rod and drivingly rotating the second drill rod, the drivingly rotating means including a housing, and means mounted on the jaw holder for supportingly mounting the second drill rod engaging means in substantial spaced relationship to the jaw holder, the means for mounting the drivingly rotating means comprising first and second arm members that each has a first end portion attached to the jaw holder and a second end portion fixedly attached to the housing, the first and second arm members first end portions being pivotally attached to the trunnions.

18. Apparatus for making up and breaking out a joint of a first drill rod and a second drill rod comprising a base, a clamp assembly mounted on the base for clampingly engaging the first drill rod, the clamp assembly including a jaw holder pivotally mounted on the base and power operated jaw means mounted on the jaw holder for clampingly engaging the first drill rod, a chuck assembly for clampingly engaging the second drill rod and drivingly rotating it, said chuck assembly including a chuck housing, a plurality of chuck jaws, operable means on the chuck housing for moving and chuck jaws between a release position and a second drill rod clamping position and drivingly rotating the chuck jaws, and a drivable member connected to the operable means for operating the operable means to drivingly rotate the chuck jaws when the drivable member is being drivenly rotated, the chuck assembly operable means including means for mounting the chuck jaws for movement between a rod clamping and a rod release position, and annular piston means for moving the jaws between their positions, the chuck housing including means that in part defines a cylinder chamber, the last mentioned means including an outer sleeve having a port opening to said chamber, and a collector sleeve mounted on the outer sleeve for rotation relative thereto and having a port opening therethrough, one of the collector sleeve and the outer sleeve having an annular groove for placing said ports in fluid communication with one another, a drive assembly that includes a housing located between the clamp assembly and the chuck assembly housing, drivable means rotatably mounted by the drive assembly housing to drivingly rotate the drivable member while permitting free movement of the driveable member relative thereto in a direction parallel to axis of rotation of the drivable member, and power operated means mounted on the drive assembly housing for drivingly rotating the drivable means, leg means for mounting the drive assembly housing on the clamp assembly in substantial spaced relationship thereto and transmitting the torque required to make and break the rod joint from the drive assembly to the clamp assembly, the leg means being pivotally mounted on the jaw holder, means connected between the base and one of the leg means and the drive assembly for retaining the drive assembly and leg means in selected adjusted pivoted positions relative the base, and cooperating means on the drive assembly housing and the collector sleeve for blocking rotary movement of the collector sleeve relative the drive assembly housing while permitting the collector sleeve being moved axially relative the drive assembly housing.

19. Apparatus for making up and breaking out a joint of a first drill rod and a second drill rod comprising a base, a clamp assembly mounted on the base for clampingly engaging the first drill rod, a chuck assembly for clampingly engaging the second drill rod and drivingly rotating it, said chuck assembly including a chuck housing, a plurality of chuck jaws, operable means on the chuck housing for moving the chuck jaws between a release position and a second drill rod clamping position and drivingly rotating the chuck jaws, and a drivable member connected to the operable means for operating the operable means to drivingly rotate the chuck jaws when the drivable member is drivingly rotated, a drive assembly that includes a housing, drivable means rotatably mounted by the drive assembly housing to drivingly rotate the drivable member while permitting free movement of the drivable member relative thereto in a direction parallel to axis of rotation of the drivable member, and power operated means mounted on the drive assembly housing for drivingly rotating the drivable means, leg means for mounting the drive assembly housing on the clamp assembly in substantial spaced relationship thereto and transmitting the torque required to make and break the rod joint from the drive assembly to the clamp assembly, the drive assembly housing being located between the clamp assembly and the chuck assembly housing, and means between the chuck assembly and the drive assembly for resiliently supporting the chuck assembly on the drive assembly while permitting axial movement of the chuck assembly relative the drive assembly.

20. The apparatus of claim 19 further characterized in that the drivable member comprises a drive tube, and that the resiliently supporting means is located within said drive tube.

* * * * *

UNITED STATES PATENT AND TRADEMARK OFFICE
CERTIFICATE OF CORRECTION

PATENT NO. : 4,309,922
DATED : January 12, 1982
INVENTOR(S) : Beckley et al

It is certified that error appears in the above-identified patent and that said Letters Patent are hereby corrected as shown below:

Column 2, line 13, after "line", insert --and--.

Column 12, line 35, change "and" to --the--.

Signed and Sealed this

Twentieth Day of April 1982

|SEAL|

Attest:

GERALD J. MOSSINGHOFF

Attesting Officer     Commissioner of Patents and Trademarks